United States Patent [19]

Goates

[11] 4,109,851

[45] Aug. 29, 1978

[54] NOVELTY POSTCARD AND METHOD

[76] Inventor: Delbert T. Goates, 1275 Chandler Dr., Salt Lake City, Utah 84103

[21] Appl. No.: 597,728

[22] Filed: Jul. 21, 1975

Related U.S. Application Data

[63] Continuation-in-part of Ser. No. 426,774, Dec. 20, 1973, abandoned.

[51] Int. Cl.[2] ...................... B32B 31/26; B29G 27/20; B42D 15/02

[52] U.S. Cl. .................................... 229/92.8; 264/230

[58] Field of Search ....................... 229/92.8; 206/497; 40/124.1, 160; 428/352, 913; 264/230

[56] References Cited

U.S. PATENT DOCUMENTS 3,677,399 7/1972 Tatar .................................. 206/497

3,756,399 9/1973 Cosier et al. ........................ 206/497

*Primary Examiner*—William Price
*Attorney, Agent, or Firm*—K. S. Cornaby

[57] ABSTRACT

A novelty postcard and method wherein a thermocontractive plastic plate is initially adhered to a backing sheet in the form of a postcard. The thermocontractive plastic plate is painted or marked with designs, drawings or other indicia. When the card has reached its destination it may be heated in an oven to between 200° and 400° F, whereupon the thermocontractive plastic plate softens and shrinks to a miniature size to form a novelty. During the heating process, the thermocontractive plastic plate separates from the message-carrying backing sheet which remains substantially the same size as it was before heating.

5 Claims, 3 Drawing Figures

NOVELTY POSTCARD AND METHOD

BACKGROUND

Related Application

This is a continuation-in-part application of my co-pending application Ser. No. 426,774 filed Dec. 20, 1973, now abandoned.

FIELD OF THE INVENTION

The invention relates to a novelty postcard and method and more particularly to a novelty postcard having a heat-shrinkable thermoplastic plate with an associated message-carrying backing sheet.

THE PRIOR ART

Several types of novelty postcards have been observed in the prior art. Among them is a postcard employing decalcomania for transferring the image on the postcard to a wood, glass or paper surface. An example of that type of postcard is found in U.S. Pat. No. 878,556. Other types of postcards employ mechanisms for sealing a personal photograph on the card and for protecting the surface of the photograph during mailing. An example of that type of postcard can be found in U.S. Pat. No. 3,346,172.

It has been found highly desirable, however, to preserve postcard souvenirs and the like by reducing the subject depicted on the postcard to an easily transportable form. The use of a heat-shrinkable thermoplastic material in combination with a message-carrying backing sheet, has not, until this invention, been known. Additionally, the prior art does not show such a card which is mailable and may be used to produce miniaturized novelty charms and the like after having been received.

BRIEF DESCRIPTION AND OBJECTS OF THE INVENTION

The present invention provides a novelty postcard which incorporates a thermocontractive plastic plate which accommodates painting, printing, or drawing on the surface thereof. Subsequent miniaturization of the thermocontractive plastic plate and the surface drawing thereon achieves a miniaturization of the artistic effect on the miniaturized article. Furthermore, the invention includes a message-carrying backing sheet which may be used to carry the message, stamp and mailing address for the postcard. When the card is heated in an oven, the thermocontractive plastic plate portion shrinks to a miniature size while simultaneously separating from the backing sheet.

It is a primary object of the present invention to provide a novelty postcard.

One still further object of the present invention is to provide a novelty postcard which, when heated, yields a miniaturize charm or the like that carries the design from the front of the postcard.

Another object of the invention is to provide a method for using a novelty postcard.

These and other objects and features of the present invention will be made more fully apparent from the following description and appended claims taken in conjunction with the accompanying drawing.

DETAILED DESCRIPTION OF THE PREFERRED EMBODIMENT

Figure 1:
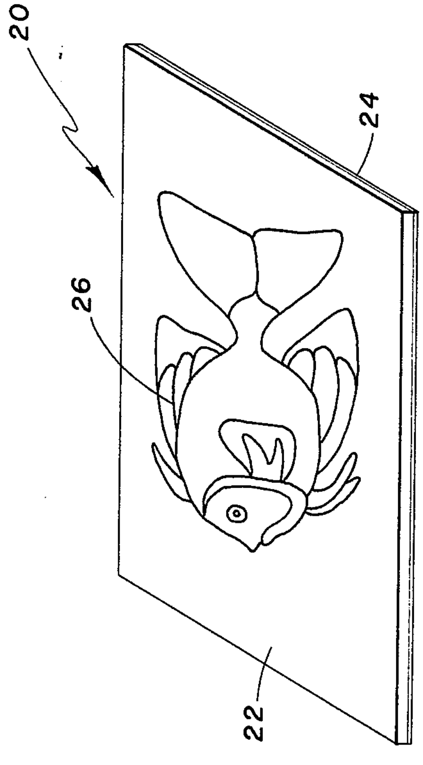
FIG. 1 is a perspective illustration of a presently preferred embodiment of the invention.

As shown in FIG. 1, the novelty postcard 20 is composed of a heat-shrinkable, thermocontractive plastic plate 22 and a backing sheet 24. The backing sheet may be any one of a wide variety of materials including paper and cardboard. The backing sheet 24 is adhesively affixed to plate 22 using an adhesive which will allow backing sheet 24 and plate 22 to separate when exposed to elevated temperatures.

Any suitable heat-release adhesive is usable in this invention. For example, one adhesive found acceptable is that commonly referred to as "pressure sensitive" adhesive. This adhesive was found to be suitable since it holds the plastic plate firmly to the backing sheet and yet releases and significantly vaporizes upon being heated within the preferred temperature range.

A drawing 26 is placed on the exterior surface of plate 22 which is a printable biaxially oriented thermocontractive plastic. The drawing 26 could be a picturesque scene or other vacation site, a fanciful figure, outline of a figure to be filled in with color, or an individualized drawing by the sender of the postcard. Clearly, any suitable indicia could be placed upon plate 22.

Figure 2:
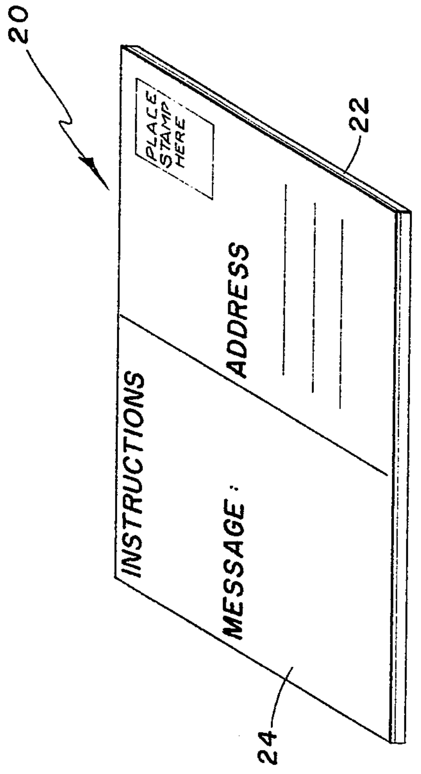
FIG. 2 is a perspective illustration of the reverse side of the presently preferred embodiment of the invention as illustrated in FIG. 1.

The reverse side of the postcard 20 is shown in FIG. 2. As the figure illustrates, the backing sheet 24 is imprinted with appropriate information including the position of the stamp, the mailing address, the area for writing a message and instructions regarding the use of the card upon receipt.

It can be recognized from FIGS. 1 and 2, that the postcard 20 would be mailed and addressed like any other type of postcard. The postcard 20 could be of any convenient rectangular size which complies with postal regulations with respect to mailing of the card.

The thermocontractive plastic plate 22 is composed of a heat-shrinkable material which will soften and substantially shrink when exposed to elevated temperatures on the order of between 200° and 400° F. Of course, other temperature which can be created in a common kitchen oven and which would cause the thermocontractive plastic plate 22 to shrink would be equally acceptable. The cited temperature range has been found to be most advantageous.

The thermocontractive plastic material for plate 22 suitable for use in this invention has been commercially available for several years and is known throughout the plastics retail trade as "Shrink Plastic". One specific plastic material is manufactured and marketed by Monsanto Corporation, St. Louis, Mo., and sold under its trade designation, "0411 Plastic". This plastic is a biaxially oriented polystyrene which may also be obtained from Magic Mini Maker, Inc., Salt Lake City, Utah.

It is believed that the plastic is manufactured by being formed as a plate which is subjected to biaxial deformation. Stretching uniformly and omnidirectionally in the plane of the plate while in the softened state while being held in its stretched state until it stiffens creates the "shrink plastic". Subsequent reheating relaxes the deformation stresses allowing the molecules in the plastic to resume their prestretched orientation. This phenomena is ofttimes referred to as "memory" and results in a considerable reduction in the planar size of the plastic during the subsequent heating step when the novel postcard is placed in the oven. There is no change in the chemistry of the plastic during heating, only a return of the plastic to its original physical configuration due to its memory.

In addition to shrinking omnidirectionally in its plane, the plate 22 thickens markedly to become rigid. For example, a preferred plate thickness of 10 mils will thicken to about 1/10 of an inch upon heating and contraction.

Figure 3:
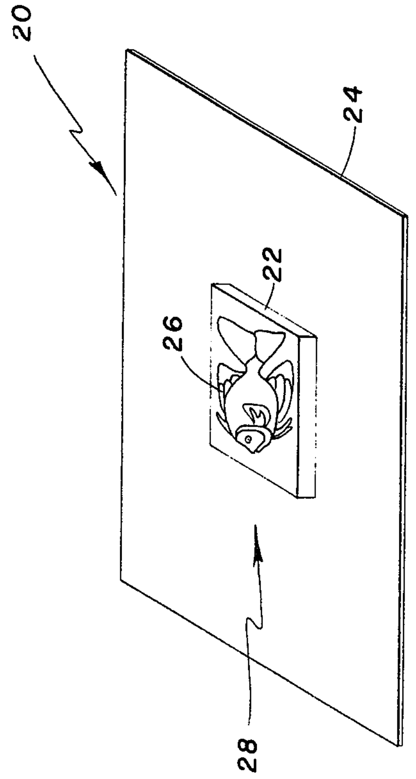
FIG. 3 is a perspective illustration of the preferred embodiment of the invention illustrated in FIG. 1 after it has been subjected to elevated temperatures.

FIG. 3 shows the card 20 after it has been exposed in an oven at a temperature within the range indicated. As shown in FIG. 3, the backing paper 24 remains approximately the same size that it was in the FIG. 1 embodiment. Plate 22, however, is substantially smaller and thickened when compared with its configuration in FIG. 1. Additionally, the drawing 26 is proportionately smaller and has become permanent part of the miniature charm 28. It should be noted that while the postcard is being heated it has been found desirable to support it on a generally flat heat-resistant surface to avoid undesirable deformation.

It has also been found desirable to punch an aperture in the card 20 before heating the card in an oven thereby providing a corresponding aperture in the resulting charm 28. Also it is possible to use scissors to cut along the peripheral edge of the drawing 26 (see FIG. 1) before heating in order to produce a charm 28 which is of the same as the drawing 26. The instruction area of the card 20 of FIG. 2 could contain information which would instruct the receiver of the alternatives and steps to be followed in reducing the plate 22 to a charm 28.

THE METHOD

The method of this invention includes preparing the novelty postcard and using the novelty postcard. The postcard is prepared by obtaining a backing sheet to serve as the address and message carrying portion of the postcard and cutting it to dimensions to comply with postal regulations. A correspondingly sized plate of biaxially oriented thermocontractive shrink plastic is prepared after being purchased from any of the numerous commercial sources and adhesively mounted to the backing sheet with a heat release adhesive.

The plastic plate is prepared by being cut to correspond with the backing sheet and imprinted with the desired design. As set forth previously, various designs and outlines may be used to appeal to the potential purchaser and user of the card.

The adhesive is a heat release adhesive, one suitable adhesive is that found on the various pressure sensitive labels and the like. Importantly, the adhesive releases upon the application of heat to permit the plastic plate material to shrink and separate from the backing sheet.

The prepared postcard is ready for use and may be addressed and suitably mailed to a receiver with a message placed on the backing sheet. Instructions for use may also be preferably included on the backing sheet.

The receiver of the postcard not only has the advantage of receiving a message from the sender but also can make a portion of the postcard into a novelty. In particular, the design on the plastic plate can be filled in with color or left as received and the outline cut with scissors, if desired. An aperture may also be punched in the plastic plate to provide a pendant.

The postcard is then placed in a heat source such as an oven and heated to a preferred temperature of 200° F to 400° F for sufficient time to cause the plastic plate to soften and shrink to its original size. Shrinkage of the biaxially oriented plastic is essentially uniform in the plane of the plastic plate thereby imparting a uniform miniaturization to the design and outline. During heating, the adhesive also softens and releases the plastic plate from the backing sheet so as to permit shrinkage and separation of the plastic plate.

After the novelty has been suitably miniaturized, it is removed from the oven and cooled whereupon it becomes a rigid novelty with a miniaturization of the design and outline. The miniaturized novelty is a desirable memorabilia for the receiver of the original postcard.

The invention may be embodied in other specific forms without departing from its spirit or essential characteristics. The described embodiment is to be considered in all respects only as illustrative and not restrictive and and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A novelty postcard comprising:

an imprinted heat-shrinkable thermoplastic plate which shrinks in size at temperatures in the range of 200°–400° F;

a backing sheet for carrying a message or other information and of substantially the same size as the thermoplastic plate; and adhesive means distributed between the thermoplastic plate and the backing sheet releasing the sheets from one another in the temperature range of 200°–400° F.

2. A novelty postcard consisting exclusively of two plates, one superimposed upon the other comprising:

a first plate comprising a heat-shrinkable thermocontractive plastic plate adaptable to have indicia placed thereon, the first plate being shrinkable upon the application of heat so as to shrink less than the other plate and thereby miniaturize the indicia and create a novelty; and a second plate comprising backing means affixed to the thermoplastic plate for carrying written information.

3. A novelty postcard consisting exclusively of two plates, one superimposed upon the other comprising:

a first plate comprising an imprinted heat-shrinkable thermoplastic plate which shrinks in size at temperatures in the range of 200°–400° F;

a second plate comprising a backing sheet for carrying a message or other information and of substantially the same size as the thermoplastic plate; and adhesive means distributed between the thermoplastic plate and the backing sheet, the adhesive releasing the sheets from one another in the temperature range of 200°–400° F.

4. A method for using a novelty postcard which produces a miniature charm when heated comprising a heat-shrinkable thermoplastic plate and an adhering backing sheet comprising the steps of:

supporting the postcard on a rigid heat-resistant surface;

creating the miniature charm by heating the postcard and supporting surface at a temperature sufficient to shrink the thermoplastic plate;

cooling the the postcard to room temperature; and removing the miniature charm from the backing sheet.

5. In a method as defined in claim 4 further comprising punching apertures in the postcard prior to performing the heating step.

* * * * *